United States Patent [19]

Weiner

[11] Patent Number: 4,841,313
[45] Date of Patent: Jun. 20, 1989

[54] RF DRIVER AND CONTROL

[75] Inventor: Nathan K. Weiner, Stoughton, Mass.

[73] Assignee: Delphax Systems, Randolph, Mass.

[21] Appl. No.: 63,155

[22] Filed: Jun. 16, 1987

[51] Int. Cl.$^4$ ............................................. G01D 15/00
[52] U.S. Cl. ..................................... 346/159; 346/154
[58] Field of Search ............... 346/158, 159, 101, 154;
400/119; 358/300; 256/423 R

[56] References Cited

U.S. PATENT DOCUMENTS 4,368,481  1/1983  Saito ..................................... 358/298

Primary Examiner—Arthur G. Evans
Attorney, Agent, or Firm—Lahive & Cockfield

[57] ABSTRACT

An RF drive network provides RF drive power to a device such as an ion deposition print cartridge synchronized with the natural resonance of the driver/device system. A voltage to current amplifier is fed by a power one-shot which triggers on a zero crossing feedback signal from the drive line, resulting in precise drive pulse synchronization and controlled drive power. A second feedback signal biases the amplifier to achieve uniformity in drive voltage and timing despite variations in component characteristics. A fault detector is connected to plural drive lines, and upon detection of an open line condition inhibits the drivers for all lines. A resonance shifting circuit shifts the resonance of each driver in its off state to damp oscillations and eliminate crosstalk between drivers. Preferred constructions drive ion deposition print cartridges for a selectable number of pulses for a desired charged distribution on a print drum, so as to achieve selective toner deposition and vary the print dot size or color.

21 Claims, 5 Drawing Sheets

RF DRIVER AND CONTROL

TECHNICAL FIELD

The present invention relates to circuitry for providing short duration high power RF drive signals to a device. One class of devices requiring such drive signals are ion deposition printer heads or "cartridges" of the type having a spaced array of ion-generating guns. In such devices, an ion printer cartridge is placed opposite a rotating print drum, and RF drive signals are applied along conduits to the guns of the cartridge to provide an ion-accelerating field for each gun. Control signals are applied to actuate those guns necessary to determine a desired latent image charge distribution on the drum. The charge on the drum is used to retain toner for subsequent transfer, under pressure, to a recipient sheet pressed against the turning drum, thereby providing a desired image on the recipient sheet.

A schematic representation of a prior art one MHz RF oscillator for driving such an ion deposition cartridge is shown in FIG. 1. Certain DC bias and start-up components have been deleted for clarity. A transistor Q1 controls current flow from a 120 volt source through a drive transformer T1. A control switch element SW1 controls the transistor. With SW1 closed (assuming start-up has occurred) Q1 is in a common base configuration with current pulses applied to the emitter of Q1 which are proportional to the voltage across T1's primary. When the transformer primary voltage Vpri goes negative, current flows out of the emitter and a corresponding collector current is established. As the tank formed by the secondary of T1 and the capacitance of the cartridge drive line begins to resonate, the voltage across the primary of T1 begins to reverse, which drives Q1 into cutoff; the circuit thus constitutes a blocking oscillator configuration. The dependent current source is derived directly from the primary of T1, and is proportional to the voltage Vpri. Since the current gain of a common base stage is less than unity, the 120 V supply must provide more power than that which is actually required to drive the load, resulting in some inefficiency.

Another problem arises when SW1 is open, i.e., when the oscillator is off. Any stray capacitance at the base of Q1 provides an AC ground which shunts SW1. While this path is not a low enough impedance to allow sustained oscillations, it does extend the turn-off time of the drive envelope and provide a return path for feedback current to flow in the event of drive stimulus from an adjacent drive line. Thus "crosstalk", which may be expected from the parallel layout of the drive lines to the dense ion gun array in a print cartridge, may result in reverse coupling though T1 being fed back to Q1, with a similar effect occurring in the drivers of parallel channels.

OBJECTS AND SUMMARY OF THE INVENTION

It is an object of the invention to provide an improved RF driver circuit for providing short duration high power RF drive signals to a device.

It is another object of the invention to provide such an RF driver circuit having an improved power level and envelope.

It is a further object of the invention to provide an RF driver circuit for driving a gray scale ion printer.

These and other desirable features are obtained in a drive network for driving a transformer-coupled resonant circuit at its resonant frequency, said resonant circuit including a transformer having a primary winding and a secondary winding and including a load element coupled across the secondary winding, wherein the inductance of the secondary winding and the capacitance of the load element substantially define the resonant frequency. The drive network includes a controllable impedance current path from a first potential through the primary winding to a second potential, means for controlling the impedance of the path in response to an applied trigger signal, and feedback means responsive to the voltage across the primary winding for generating the trigger signal and for applying the trigger signal to the impedance control means. This establishes an oscillatory current in the current path at the resonant frequency. The feedback means responds to the voltage across said primary winding to generate an AC signal representative of the AC component of the voltage across the primary winding measured with respect to a reference potential, and a trigger generator responds to the AC signal by generating a trigger signal having a succession of voltage pulses substantially in a predetermined phase relation with the oscillatory current and with alternate ones of the crossings of the reference potential by the AC signal.

In one embodiment, the controllable impedance path includes a field effect transistor having its drain electrode coupled to the primary winding, its source electrode coupled to the second potential, and its gate electrode coupled to the feedback means for receiving the trigger signal. Preferably, the drive network includes a resistor coupled between the source electrode and the second potential, resulting in more uniform gain characteristics of the drive circuit despite manufacturing variations in the characteristics of circuit components.

In an ion deposition printer, plural driver circuits provide RF drive signals to parallel drive lines, and a plurality of drive lines are monitored by a common fault detector; the drive signal is inhibited when an open drive line or excessive voltage fault condition is detected. In yet a further embodiment, a damping circuit selectively shifts the resonance of the driver in its off state. This damps the drive envelope, and decouples the driver from adjacent drivers, thus eliminating crosstalk. In preferred implementations, the drive oscillations are controlled in voltage to effectively drive print cartridges of selected characteristics, and are controlled in duration to achieve a desired print characteristic.

BRIEF DESCRIPTION OF DRAWINGS

These and other features of the invention will be appreciated with reference to the following description, taken together with the drawings, in which.

DESCRIPTION OF ILLUSTRATED EMBODIMENTS

Figure 1:
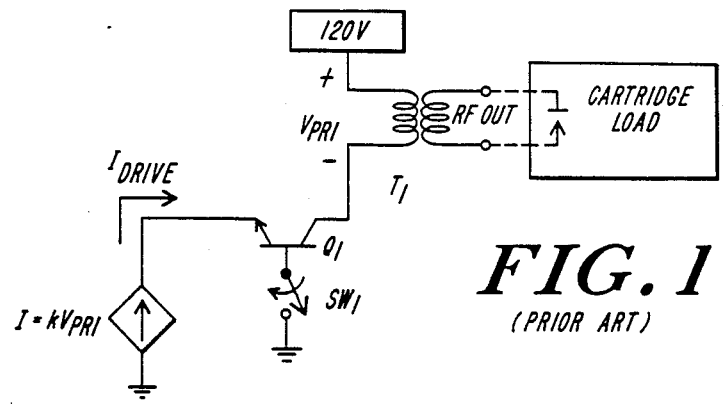
FIG. 1 shows a prior art RF driver network.
Figure 2:
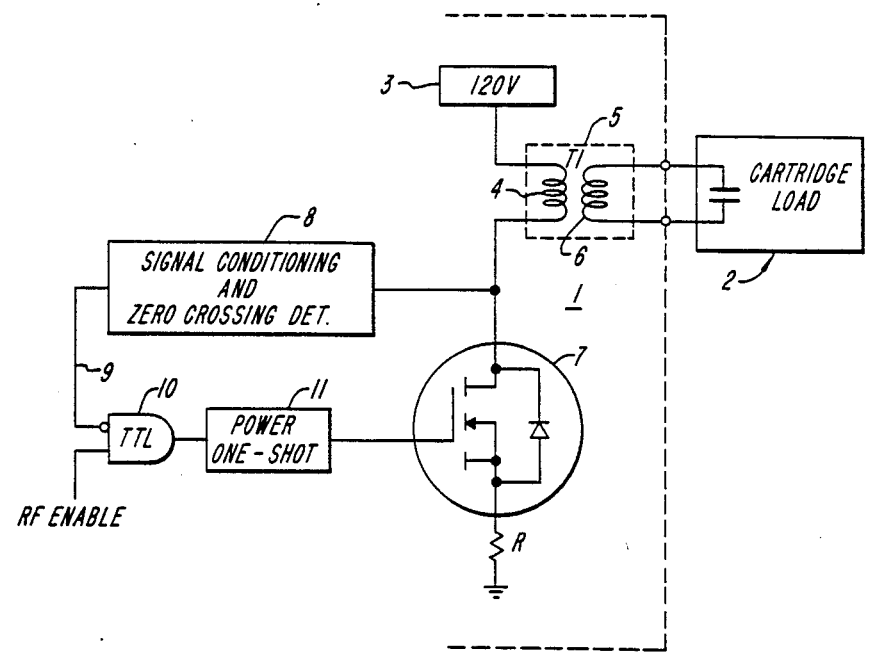
FIG. 2 is a simplified block diagram of an RF driver network according to the invention.

FIG. 2 shows a block diagram of an RF driver network 1 according to one aspect of the present invention, together with a cartridge 2. A power source 3 is connected to the primary winding 4 of a step up transformer 5. The secondary winding 6 of transformer 5 is coupled to the cartridge 2 such that the inductance of the transformer (T1) 5 and the characteristic capacitance of the cartridge 2 form a resonant circuit or tank.

A metal oxide semiconductor (MOS) field effect transistor (FET) 7, and a series-connected resistor R established a controlled drive current path through the primary winding 4 to ground potential. A feedback path is established between the primary winding 4 and the gate electrode of FET 7. To provide this feedback path, a signal conditioning and zero crossing detector circuit 8 monitors the voltage at the primary winding 4. The output circuit of 8 is coupled along line 9 to an inverting input of an AND gate 10. A non-inverting input of gate 10 is adapted to receive a binary RF enable signal which selectively enables that gate at appropriate times determined in accordance with a control program for the cartridge 2. The output of AND gate 10 is coupled to a power one-shot network 11 which in turn is connected to the gate electrode of transistor 7.

Operation is as follows. Initially, FET 7 is non-conductive, and the tank formed by transformer T1 and the cartridge 2 is quiescent, and the input level at the non-inverting input to gate 10 is low. An applied RF enable signal at the non-inverting input of gate 10 enables that gate for the duration of that signal. The leading edge of the applied RF enable signal propagates through gate 10 and triggers the one-shot network 11. The output of one shot network 11, when triggered this first time, is amplified in both voltage and current, and supplies a relatively wide pulse to the gate electrode of FET 7. In response to this pulse, FET enters its conductive state and delivers a relatively wide initial current pulse to the primary winding 4 of T1. Transformer T1 converts this pulse to a high voltage drive pulse in its secondary winding 6 for application to cartridge 2.

At the end of this initial pulse, the voltage at the drain electrode of FET 7 begins to oscillate at the resonant frequency determined by the secondary winding inductance of T1 and the capacitance of the cartridge 2. As the AC component of that oscillating drain voltage crosses zero (i.e., goes from positive to negative) the first time, the zero crossing detector network 8 applies a pulse to the inverting input of the enabled gate 10. That pulse propagates through gate 10 and re-triggers the one shot network 11, causing the latter network to deliver another pulse to the gate of FET 7. Subsequent cycles are similarly activated by the negative going zero crossings of the feedback signal at the drain electrode of FET 7. After the first cycle, the drive pulses to T1 are smaller in both magnitude and duration. This truncation of the transformer drive occurs when the drain voltage, already moving towards ground due to natural oscillation, takes very little additional energy to saturate FET 7.

Since only a very small voltage is present at the drain electrode at the low point of the resonant cycle, and this effectively constitutes the drain supply, the drain current goes to zero, or even slightly negative depending on the previous drive pulse, thus terminating the drive pulse before it can rise to the same full amplitude of the first, or start-up, pulse. When FET 7 saturates, the Rdson characteristic of FET 7 ensures that the drain voltage is clamped effectively to ground, dumping any excess load circuit energy. As a result, the drive pulses following the initial drive pulse (the "keep alive" drive pulses) to the primary of T1 are limited in both amplitude and duration compared to the initial pulse. Thus, amplitude stabilization is achieved through the clamping action of the saturated FET, which ensures that each positive going drain cycle starts from ground potential.

Figure 3:
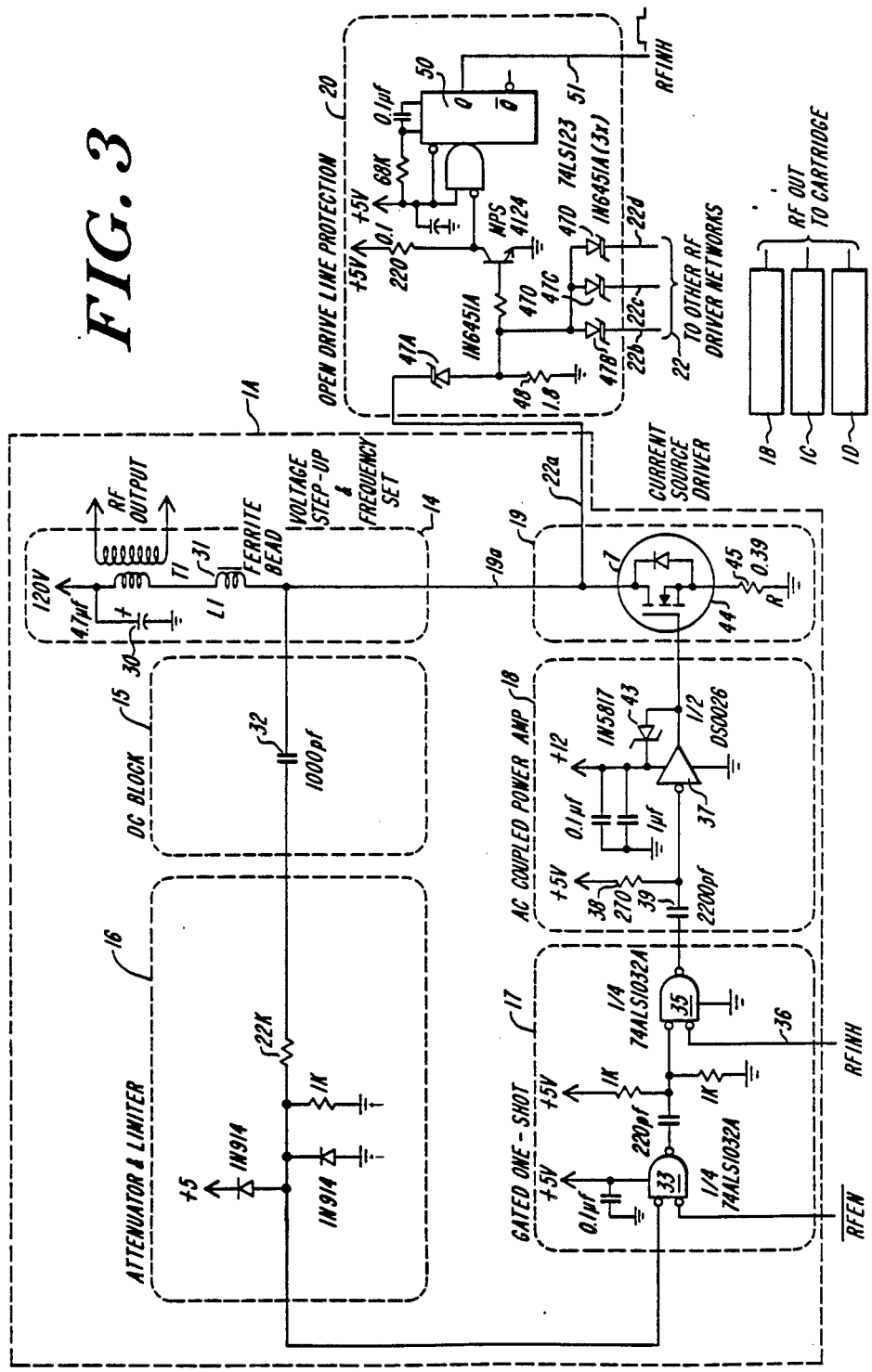
FIG. 3 is a detailed circuit diagram of one presently preferred embodiment of the RF driver network shown in FIG. 2.

FIG. 3 shows a detailed schematic of a four element 2.5 MHz RF driver. That four element RF driver includes four individual RF driver networks (1A, 1B, 1C, 1D) of the general form shown in FIG. 2, incorporating refinements to minimize performance variations due to variations of component characteristics within manufacturing tolerances, and to provide oscillator protection against short circuit and open circuit conditions which may occur within an operating printer environment. In FIG. 3, one RF driver network 1A is shown in detail coupled by line 22a to an open drive line protection network 20. Network 20 is similarly connected by lines 22b, 22c and 22d to the other identical RF driver networks 1B, 1C and 1D.

RF driver network 1A includes a voltage step-up and frequency set circuit 14, a DC block 15, an attenuator and limiter 16, a gated one-shot 17, an AC coupled power amplifier 18 and a current source driver 19. In FIG. 3, elements or modules 14–17 correspond to the more generally shown elements 8–11 of FIG. 2.

The detailed construction of a preferred implementation of these modules in driver 1A is discussed below.

The frequency of oscillation (Fout) for the RF driver network 1 is determined by the secondary inductance of the transformer T1 and the capacitance of the cartridge to be coupled to the secondary winding. That frequency may be expressed as:

$$Fout \cong \frac{1}{2\pi \sqrt{L_{tot} C_{tot}}}$$

where $C_{tot}$, and $L_{tot}$ are the total capacitance and inductance, respectively, of the transformer secondary circuit. This includes transformer secondary inductance, and leakage inductance, cartridge capacitance (static and dynamic), and any stray inductance and capacitance.

The transformer T1 also provides the voltage amplification, or step up, necessary to obtain the desired output voltage, in this exemplary case, 2500 volts. A 4.7 $\mu f$ capacitor 30 is placed as close as physically possible to the transformer T1 to provide local bulk decoupling for the high peak currents being delivered. In the four driver configuration of FIG. 3, the capacitance 30 is preferably provided by an individual capacitors. This has the advantage of paralleling the equivalent series resistance of the four capacitors, as well as reducing the effects of the inductance of the printed circuit etch which would exist between a single bulk decoupling capacitor and each driver of the four driver configuration.

A ferrite bead 31 is placed in series with the primary winding of transformer T1. Bead 31 works in concert with the parasitic drain capacitance to provide high frequency noise suppression. In the present embodiment, the expected noise is comprised of a very fast, less than 20 nS, high voltage spike and its attendant ringing, which could couple through the feedback elements 15-17 and cause both RF interference and spurious firing of the one-shot network. The high voltage spike could also cause unnecessary tripping of the open drive line protection circuit 20. The spike is an L(di/dt) transient where L is the leakage inductance of the transformer plus any additional stray inductance in the wiring. In the present embodiment, the start-up current pulse is approximately three times greater than subsequent drive pulses, and consequently the transient is highest at the end of the first drive cycle. The first cycle does not saturate FET 7, so FET 7 appears to the primary of T1 as a current source whose magnitude is determined by the pulse amplitude at the gate electrode, the MOSFET transconductance, gfs, and the source feedback resistor R. When the FET 7 is turned off, the voltage at the drain electrode (at line 19a) begins to oscillate in response to the secondary circuit resonance.

The DC block 15 consists of a 1000 pf capacitor 32 to provide the AC component of the drain voltage and block the 120V (DC) power supply potential. The reactance of capacitor 32 is small compared to the 22K input impedance of the attenuator/limiter 16, so as to keep the feedback phase shift low. In the present embodiment, the phase shift is approximately:

$$\theta = \cos^{-1}(22K/\sqrt{(Xc)^2 + (22K)^2})$$

$$\theta = 0.17°$$

where Xc=64 Ohms for the 2.5 MHz drive frequency. This corresponds to a delay of less than half a nanosecond.

The attenuator and limiter network 16 divides the approximately 250 volt drain voltage down and clamps the resultant signal between ground and 5 volts. In the present configuration, the feedback factor is 1/23. This provides an approximately 250/23 or 10.9 volt AC signal, the negative half of which is clamped to ground potential, leaving just over 5 volts peak to drive the gated one-shot network 17. This is well above the logic "1" threshold necessary for the TTL elements forming the principal elements of that network 17.

The gated one-shot network 17 consists of two gates 33, 35 connected as shown in FIG. 3. The voltage gain of gate 33 in this circuit further conditions the output of the attenuator/limiter 16 and provides a clean negative transition when the drain voltage passes through its midpoint (i.e. zero crossing) in the negative going direction. Gate 33 also receives as an input an RFEN signal (RF enable, low activated) which selectively enables the RF driver network 1A.

In operation, between times when this network is enabled, the output of gate 33 is high. When the network 1A is enabled in response to the applied RFEN signal, a four volt square wave is produced at the output of gate 33 while the driver network 1A is oscillating. A network comprised of a 220 pf capacitor 34 two 1K resistors differentiates the square wave from gate 33 to form exponentially decaying positive and negative going pulses biased at a 2.5 volt level, corresponding to a logic "1". The pulses are applied to gate 35, which is used as a threshold comparator. This forms a one shot network which produces a negative going pulse for every negative going zero crossing of the drain voltage.

In addition to providing the 2.5 volt bias for gate 35, the 1K resistors provide a Thevinin equivalent resistance of about 500 ohms, independent of the input of the TTL gate 33, for the 220 pf capacitor to work against. When the drive network 1A is not enabled, the input to the second gate 35 is held at 2.5 volts, a logic "1".

Since the voltage at the input of gate 35 is initially at 2.5 volts, the first negative edge from gate 33 causes the input of gate 35 to go to −1.5 volt, and charge exponentially positive from there until gate 33 returns to a logic "1" in response to the feedback.

The duration of the first pulse in a burst, the "start-up" pulse, is calculated as the time it takes for the input of gate 33 to charge to a logic "1" threshold of about 1.4 volts given a minus four volt step input, and an initial condition of 2.5 volts. The one-shot network on-time is therefore determined as follows:

$$1.4 - (2.5 - 4) = 4(1 - e^{-t/RC})$$

$$t = -RC \ln((2.9 - 4)/(-4))$$

If: $R = 500$ Ohms, and $C = 200$ pf then $t = 142$ nS

By putting tolerance on the parameters of the above equation, a worst case spread in one-shot pulse widths is obtained for use in modeling the FET 7 output sensitivity to input pulse width.

The remaining pulses in the burst are calculated with a different initial condition, in this case 3.5 volts, at the input of gate 35 due to residual charge on the 220 pf capacitor after the positive edge of the square wave is differentiated. Using these new values the one shot pulse width is now:

$$1.4 - (3.5 - 4) = 4(1 - e^{-t/RC})$$

$$t = -RC \ln((1.9 - 4)/(-4)) = 71 \text{ nS}$$

This effect produces a wide drive pulse at start-up, (approximately 140 nS) enhancing the envelope risetime and power supply efficiency, followed by a succession of narrow drive pulses (approximately 70 nS).

In addition to varying the duration of the drive pulses, it is possible to delay the initiation of the drive pulses, e.g., by delaying the trigger signal such that the drive pulse occurs in a predetermined phase relationship to the oscillatory drain current and the AC signal. The drive pulse may be initiated between zero radians up to just before $\pi/2$ radians after the AC signal crosses the trigger threshold. In the illustrated circuit of FIG. 3, the drive pulse fires at approximately $\pi/8$ to $\pi/4$ radians following the negative-going AC crossing. By appropriate circuit modification, drive pulses may, in addition, be applied to each half wave of the resonant signal and not just the negative portion thereof.

Figure 4:
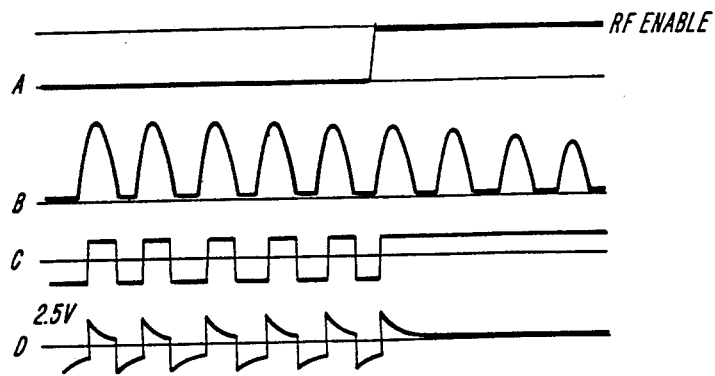
FIGS. 4–6 are timing and signal diagrams.

FIG. 4, in lines A-D thereof, shows the observed relationship, from oscilloscope traces, respectively, of: (A) the RF enable, (B) the input to the gate of the gated one-shot; (C) the output of the first gate; and (D) the output of the differentiator.

Figure 5:
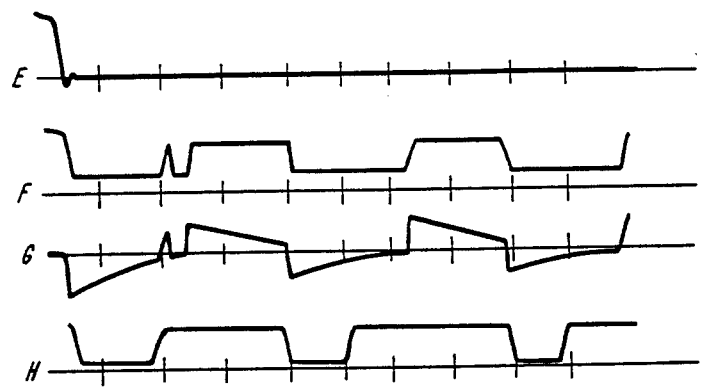

FIG. 5, in lines E-H, shows the relationship, respectively, of: (E) the leading edge of the RF enable; (F) the output of gate 33; (G) the output of the differentiator; and (H) the output of the one-shot network. The horizontal axis is divided in 100 nS increments. Although the effect of the drain voltage spike is noticeable during the first cycle, there is no adverse effect on the one-shot output, as the differentiator output is already above the logic "1" threshold. The first one-shot pulse (bottom trace) is about 140 nS and subsequent pulses are about 80 nS, corresponding to the above mathematical prediction.

The second gate 35 of the gated one shot network 17 receives an RF inhibit signal (RFINH) on line 36 to disable the oscillator when the open drive line protection circuit, discussed below, detects a fault. This line is normally held at logic "0", which keeps gate 35 enabled.

The AC coupled power amplifier 18 consists of a relatively fast high power driver chip 37 which is preferably a DS0026 manufactured by National Semiconductor. The input to the DS0026 is AC coupled to allow the oscillator disabled condition to hold the gate electrode of FET 7 at zero volts. This is accomplished by way of a 270 ohm pull-up resistor 38 at the input of the DS0026. For this driver chip, the input is current sensitive, not a standard TTL input; also, around 10 mA is required to guarantee a logic "1" input condition. This should occur at around 2.4 volts. The value of pull-up resistor 270 is selected to ensure an adequate signal at the amplifier input.

A coupling capacitor 39, having a value of approximately 2200 pf, AC couples the input to the power driver chip 37. Chip 37 is decoupled by capacitors 41, 42. These capacitors are preferably located as close to the chip as possible using both a 1 $\mu$F tantalum and a 0.1 $\mu$F disc, because high frequency switching transients in excess of an ampere are present.

An external Schottky clamp diode 43 at the output of the DS 0026 reduces the high overshoot due to the parasitic drain to the gate coupling capacitance and/or lead inductance between DS 0026 and the Mosfet gate. The clamp diode serves to protect the gate against high voltage transients and also serves to reduce start-up pulse variations with different Mosfets used for FET 7.

In the present embodiment the current source driver 19 uses a Mosfet such as an IRF 843, for FET 7. The resistor R is 0.39 Ohms, and that resistor biases the gate of FET 7, resulting in a substantially uniform output despite variations in the gate threshold voltage or the transfer function of the particular Mosfet being used.

With this configuration, the enable signal (RFEN) applied to gate 33 results in a 2.5 MHz sequence of relatively high current pulses in the primary winding of transformer T1 with the first pulse being approximately 10A, 145 nS with a relatively fast rise time, followed by a succession of approximately 4A, 75 nS pulses. These pulses cause a corresponding succession of approximately 2500 volt peak to peak pulses to be applied to the cartridge 2. This completes the description of the driver portion circuit 1A.

In addition to the above described structure, when used in a ion deposition print apparatus, a driver network 1A according to the invention preferably contains fault protection circuitry to protect against open drive lines by disabling the driver and clamping transient voltages to safe levels.

Such a circuit is shown by network 20 in FIG. 3. Fault protection network 20 is connected to the primary current path of driver network 1A by way of lines 22a and 19a, and a zener diode 47A of heavy construction and power dissipating ability. Such diodes are sold under the trade name Transzorb by General Instruments, and may, for example, be exposed to power levels in the range of 500 watts for a millisecond or more. A suitable unit for this application is a IN6451A, which is rated for 10nS pulses of over 30 kw at a 0.05% duty cycle. Identical type zener diodes 47B, 47C and 47D are connected to the corresponding current paths of driver networks 1B, 1C, and 1D via lines 22b, 22c and 22d respectively. When the drain voltage of any of driver networks 1A-1D exceeds the breakdown voltage of its Transzorb diode, that diode starts to conduct. Current flows through the Transzorb diode and a current sense resistor 48. When the voltage across the sense resistor 48 is somewhat above the Vbe of NPN transistor 49, the transistor turns on and triggers a one-shot element 50 to produce an RF inhibit signal (RFINH) on line 51, which is provided to line 36 of the gated one-shot 17 of each of the RF driver networks 1A-1D, thus disabling all four of the RF drivers 1A-1D on that board for the one-shot period of element 50.

The transient current trip threshold is not critical. In order not to have nuisance trips, a minimum transient current of above 0.5A is assumed. Since it takes a little over 0.7 volts to turn on the transistor 49, say 1 volt, the Transzorb diode current sense resistor is calculated as follows:

$$1 \text{ volt}/0.5 \text{ amps} = 2 \text{ Ohms}$$

thus, 1.8 Ohms was selected as a good standard value for the presently described embodiment of FIG. 3.

The Transzorb diode transient current pulses from all four drivers 1A-1D are in effect "ORed" into the single 1.8 Ohm current sense resistor 48 to utilize a common one-shot element 50. In other embodiments, separate protection networks may be used for individual driver networks, if desired. In that case, a logic decoder having gates which are enabled by the Transzorb fault signals selectively passes the RFINH signal only to the faulty driver.

In an ion deposition printer, the secondary voltage of the transformer for driving the print cartridge is preferably in the range of two to three kilovolts. Upon occurrence of an open line condition, when the start-up pulse ends, the secondary circuit of the output circuit would start to resonate. Since the secondary winding is then parallel only to the stray capacitance, which would be far less than the normal output loan capacitance, a rather high drain voltage may be expected, on the order of six hundred volts. The line protection network 20 clamps the start up transients to about three hundred volts, and results in a self resonance of about 8 MHz.

Figure 6:
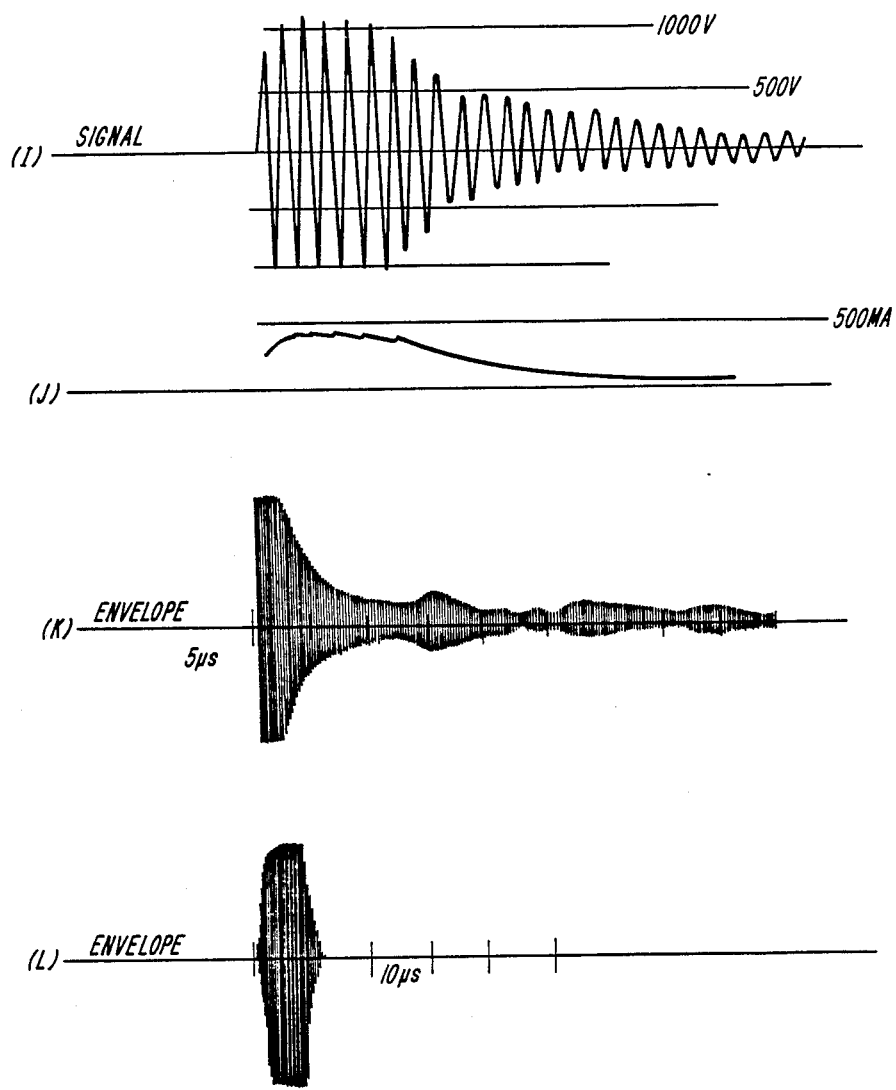

In FIG. 6 lines (I) and (J) show plots of drive power and envelope characteristics of RF drive network 1A for driving an exemplary ion print cartridge. Lines (I) and (J) show, respectively, a typical RF output burst at the primary winding of transformer T1 and the supply current drawn from the 120 V supply. The RF output burst has a slowly decaying envelope, and the supply current ranges from 400 mA to 600 mA depending on cartridge capacitance and peak to peak voltage of the driver.

In FIG. 6, line (K) shows the envelope of a drive line signal, illustrating resulting crosstalk (on the order of 700 volts peak to peak) measured in a drive line of an ion deposition printer operating at a sixty page per minute print speed.

Applicant has found that high printing speeds are obtained with better print quality by damping the trailing edges of the RF envelope, to permit faster drive line synchronization and to limit crosstalk. One obvious way to accomplish such damping is to provide a third winding in the transformer T1, and to shunt the terminals of the winding when the driver is not enabled.

In a preferred embodiment, however, this damping is accomplished by connecting a frequency shift damping circuit to the drive line 19a indicated in FIG. 3. Line (L) of FIG. 6 shows the essentially cross talk free damped drive envelope of an RF driver network having such a frequency shift damping circuit. A representative frequency shift damping circuit 60 is shown in FIG. 7.

Figure 7:
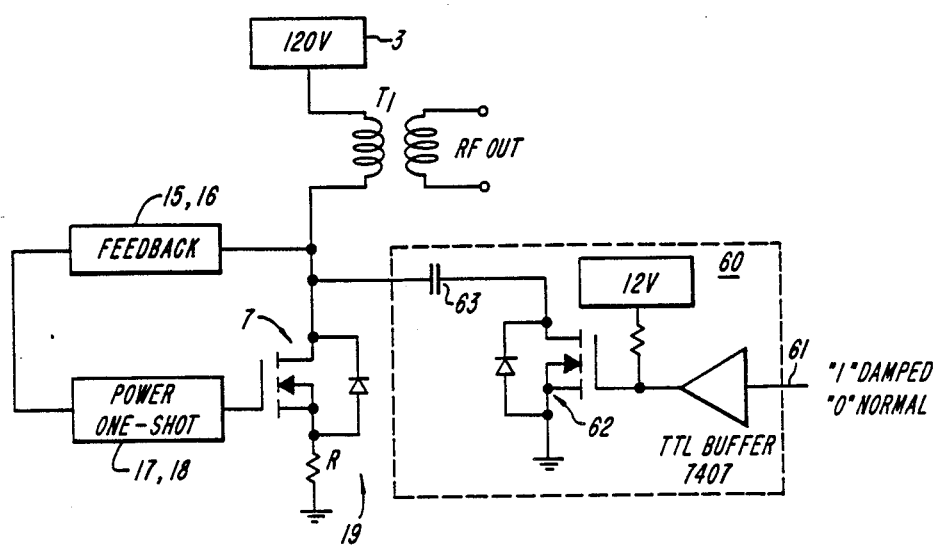
FIG. 7 shows a damping circuit to improve the drive signal envelope.

As shown in FIG. 7, damping circuit 60 receives a "0" or "1" signal along line 61 to turn on a Mosfet switching element 62. When switching element 62 is conductive a capacitor 63 is effectively added in parallel to the driver circuit. This added capacitor 63 shifts the resonant frequency of the driver, so that there is insufficient "Q" at the new resonant frequency to support high amplitude oscillations. Residual energy stored in the tank is then quickly dissipated and the tank oscillation abruptly ceases. Line (L) of FIG. 6 shows the resultant RF burst with a drive circuit employing resonant-shift damping as pictured above. All "off" drivers on a given board are maintained in the shifted resonance state, and are shifted back by appropriate signals provided along line 61, just before the RF enable signal, thus making them insensitive to crosstalk effects. By way of scale, the RF burst of line (L) shows a burst 6.4 $\mu$s wide at a 2.5 MHz RF frequency.

Yet another method of achieving a sharply-defined non-decaying burst is to provide a defined number of drive pulses (e.g., five or six) which are triggered by one shot 35 to occur in phase with the oscillatory drain voltage, followed by a kill pulse which is triggered to occur out of phase with the voltage. This may be accomplished by modifying gate circuit 17 to include a pulse counter, or a gate circuit which triggers on the trailing edge of the RFEN signal.

In addition to providing a RF oscillator having an improved burst envelope for driving an ion deposition printer, applicant has performed experiments driving such a printer with an RF oscillator having independently controlled envelope risetime, amplitude and duration parameters. These experiments revealed that once the drive voltage exceeds a certain threshold voltage at which all ion guns or "holes" of the print cartridge are active and strong, little change in print density or stroke width of the image is obtained by further increasing the voltage.

Specifically, for a print cartridge having a 2600 V nominal peak to peak drive voltage, full printing capability was achieved at 1800–1900 V, and, thereafter, increasing the voltage up to 3KV did not noticeably improve print quality. Applicant concluded that with drive oscillators according to the invention having stable and well defined RF drive signals, print cartridges are dependably operated at significantly lower voltages, resulting in longer cartridge lifetimes. Further, at such lower voltages print cartridges may be fabricated using synthetic insulating materials, offering great cost savings and uniformity over mica-based constructions.

Applicant further found that at a constant drive voltage, the print stroke width is approximately linearly related to the number of RF cycles in a single drive burst. Print samples printed with RF bursts of 1,2,3,4,5,6,8,10,12 and 14 cycles were analyzed, and it was found that the number of drive pulses was directly proportional to the print density achieved. This range of near-linear print density shows that gray scale modulation in an ion deposition printer is achieved in an ion print cartridge of conventional construction by varying the length of the drive burst in accordance with a desired print density. Also, with a constant length drive burst, the usual "finger pulse" used to turn on or off an ion gun of a print cartridge may be replaced by a pulse width modulated (PWM) finger pulse, which may, for example, be implemented using a four bit finger register rather than the one bit register currently used, to activate each ion gun for a controlled position of the drive burst. This vastly expands the printing capabilities of ion deposition printers using simple modifications of printer control circuitry.

Figure 8:
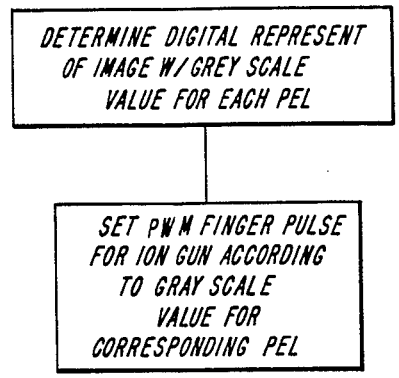
FIG. 8 shows an RF drive method for ion deposition printing.

FIG. 8 shows the steps involved in implementing gray scale ion deposition printing according to this aspect of applicant's invention. Essentially, in order to achieve gray scale printing, one creates a digital representation of a desired image including the gray scale digital value for each pel, and then controls the print cartridge by providing a PWM finger pulse to each ion gun with the pulse width set in accordance with the gray scale value for that gun's pel.

It is believed that the linear print density to drive pulse width relation noted above indicates a linear relationship between the number of drive pulses and the corresponding localized charge deposited on the print drum of an ionographic printer. Since the charge is proportional to voltage, applicant's invention provides an apparatus for precisely controlling the imaging voltage on a print drum. By using voltage-sensitive colored toners, and selectively controlling the charges applied to the drum so as to pick up a toner of a desired color, it is anticipated that multicolor ionographic printing may be achieved in a single drum machine using applicant's driver.

The above description of an improved RF oscillator with defined drive characteristics, and the description of its use and of novel constructions and operation of an ion deposition printer has been made to illustrate the particular embodiments shown in the Figures, and is intended as illustrative of the invention, but not limiting thereof. These and other aspects of applicant's invention being thus disclosed, modifications and variations will occur to those of ordinary skill in the art, and all such modifications and variations are believed to be within the scope of the invention, as set forth in the claims appended hereto.

What is claimed is:

1. A drive network for driving a transformer-coupled resonant circuit at its resonant frequency F, said resonant circuit including a transformer having a primary winding and a secondary winding and including a load element coupled across said secondary winding, wherein the inductance of said secondary winding and the capacitance of said load element substantially define said resonant frequency, comprising:
   A. current means coupled to said primary winding for establishing a controllable impedance current path from a first potential through said primary winding to a second potential and including means for controlling said impedance of said path in response to an applied trigger signal, and
   B. feedback means responsive to the voltage across said primary winding for generating said trigger signal and applying said trigger signal to said impedance control means whereby an oscillatory current is established in said current path at said resonant frequency, said feedback means including:

i. an AC signal means responsive to said voltage across said primary winding to generate an AC signal representative of the AC component of said voltage across said primary winding measured with respect to a reference potential, ii. a trigger generator means responsive to said AC signal for generating a trigger signal having a succession of voltage pulses substantially in a predetermined phase relation to the oscillatory current and alternate ones of the crossings of said reference potential by said AC signal, and iii. means for applying said trigger signal to said impedance control means.

2. A drive network according to claim 1, wherein said trigger generator means includes means for generating said succession of voltage pulses having a phase offset from crossings of said AC signal by a delay in the range of 0 to $\pi/2$ radians.

3. A drive network according to claim 1, wherein said current means includes a field effect transistor having its drain electrode coupled to said primary winding, its source electrode coupled to said second potential, and its gate electrode coupled to said feedback means for receiving said trigger signal, said field effect transistor being characterized by a current path between said source electrode and drain electrode which varies with the voltage across said gate electrode and said source electrode.

4. A drive network according to claim 3, wherein said current means further includes a resistor coupled between said source electrode and said second potential.

5. A drive network according to claim 1, wherein said trigger generator means includes a zero crossing detector responsive to said AC signal to generate a square wave signal having transitions substantially coincident with the zero crossings of said AC signal, and a one shot network responsive to said square wave signal to generate said trigger signal.

6. A drive network according to claim 1, wherein said feedback means further includes an enable controller, said enable controller including means for selectively controlling said feedback means to be operable to generate said trigger signal in response to an applied enable signal and to be response to an applied enable signal and to be inoperative otherwise.

7. A drive network according to claim 5, wherein said feedback means further includes an enable controller, said enable controller including means for selectively controlling said feedback means to be operable to generate said trigger signal in response to an applied enable signal and to be inoperative otherwise.

8. A drive network according to claim 1, wherein said feedback means further includes an inhibit controller, said inhibit controller including means for selectively controlling said feedback means to be inoperative in response to an applied inhibit signal and to be operable to generate said trigger signal otherwise.

9. A drive network according to claim 6, wherein said feedback means further includes an inhibit controller, said inhibit controller including means for selectively controlling said feedback means to be inoperative in response to an applied inhibit signal and to be operable to generate said trigger signal otherwise.

10. A drive network according to claim 8, further comprising means for detecting a failure condition and generating said inhibit signal in response thereto.

11. A drive network according to claim 9, further comprising means for detecting a failure condition and generating said inhibit signal in response thereto.

12. A drive network according to claim 11, further including resonance shifting means for shifting said resonant frequency of said drive network in synchrony with said inhibit signal.

13. A drive network according to claim 10, wherein said detecting means includes i. a zener diode and resistor coupled between said primary winding and said second potential, and ii. sensing means for detecting times when the voltage drop across said resistor exceeds a predetermined threshold and for generating said inhibit signal only during said times.

14. A drive network according to claim 12, wherein said detecting means includes i. a zener diode and resistor coupled between said primary winding and said second potential, and ii. sensing means for detecting times when the voltage drop across said resistor exceeds a predetermined threshold and for generating said inhibit signal only during said times.

15. A drive network according to claim 6, further comprising a resonance shift means operative at times other than during said enable signal for coupling a capacitor to said primary winding whereby said resonant frequency of said resonant circuit at such times differs from said resonant frequency during said enable signal.

16. A drive network according to claim 15, wherein said current means includes a field effect transistor having its drain electrode coupled to said primary winding, its source electrode coupled to said second potential, and its gate electrode coupled to said feedback means for receiving said trigger signal, said field effect transistor being characterized by a current path between said source electrode and drain electrode which varies with the voltage across said gate electrode and said source electrode, and wherein said resonance shift means includes said capacitor coupled in series with a switch to said primary winding and includes a switch controller selectively operative at times other than during said enable signal to couple said capacitor between said primary winding and a third reference potential and operative at all other times to decouple said capacitor from said primary winding.

17. A drive network according to claim 16, wherein said switch is a field effect transistor having its drain electrode connected to said capacitor, its source electrode connected to said third reference potential, and its gate electrode connected to said switch controller.

18. A method of controlling an ion deposition printer of the type having a printhead cartridge wherein a plurality of RF drive lines control an array of ion guns which direct charge carriers under the control of an RF drive signal burst at a characteristic RF frequency f having a period $t=1/f$, for affecting a charge on a print member, such method comprising the step of linearly controlling the duration of a finger control signal synchronized with said RF drive signal burst to provide different numbers of effective oscillatory excursions of said RF drive signal and vary the number of charge carriers directed at a region of the print member in accordance with a desired print characteristic.

19. The method of claim 18, wherein the step of linearly controlling the duration includes controlling said duration to be an approximately integral multiple of t between $n_0 t$ and $n_1 t$, where $n_0$ is selected such that substantially all ion guns of the cartridge fire with a finger signal of duration $n_0 t$, and $n_1 t$ is selected such that an ion gun produces substantially maximal size dots with a finger signal of duration $n_1 t$.

20. The method of claim 18, wherein the drive signal is provided to an ion gun by a drive network, and wherein the method further comprises the steps of controlling said network to provide said drive signal during a first time interval, and shifting a natural resonant frequency of said network outside said first interval.

21. A drive network according to claim 1, further comprising means for applying a drive pulse to said current path in opposite phase to said oscillatory current for damping current in the path.

* * * * *